Sept. 11, 1951 M. BONNET 2,567,633

PERI STEREOSCOPIC PRINTER FOR MULTIPLE IMAGE NEGATIVES

Filed Nov. 5, 1945 3 Sheets-Sheet 1

INVENTOR.
Maurice Bonnet
BY
Haseltine, Lake & Co.
AGENTS.

Sept. 11, 1951 M. BONNET 2,567,633

PERI STEREOSCOPIC PRINTER FOR MULTIPLE IMAGE NEGATIVES

Filed Nov. 5, 1945 3 Sheets-Sheet 2

INVENTOR.
Maurice Bonnet
BY
Haseltine, Lake & Co.
AGENTS.

Sept. 11, 1951 M. BONNET 2,567,633

PERI STEREOSCOPIC PRINTER FOR MULTIPLE IMAGE NEGATIVES

Filed Nov. 5, 1945 3 Sheets-Sheet 3

INVENTOR.
Maurice Bonnet
BY
Haseltine, Lake & Co.
AGENTS.

Patented Sept. 11, 1951

2,567,633

UNITED STATES PATENT OFFICE 2,567,633

PERISTEREOSCOPIC PRINTER FOR MULTIPLE IMAGE NEGATIVES

Maurice Bonnet, Paris, France, assignor to La Reliephographie, Societe pour l'Exploitation des Procedes de Photographie en Relief Maurice Bonnet, Paris, France, a corporation of France Application November 5, 1945, Serial No. 626,834
In France October 21, 1944

Section 1, Public Law 690, August 8, 1946
Patent expires October 21, 1964

9 Claims. (Cl. 88—24)

Figure 2:
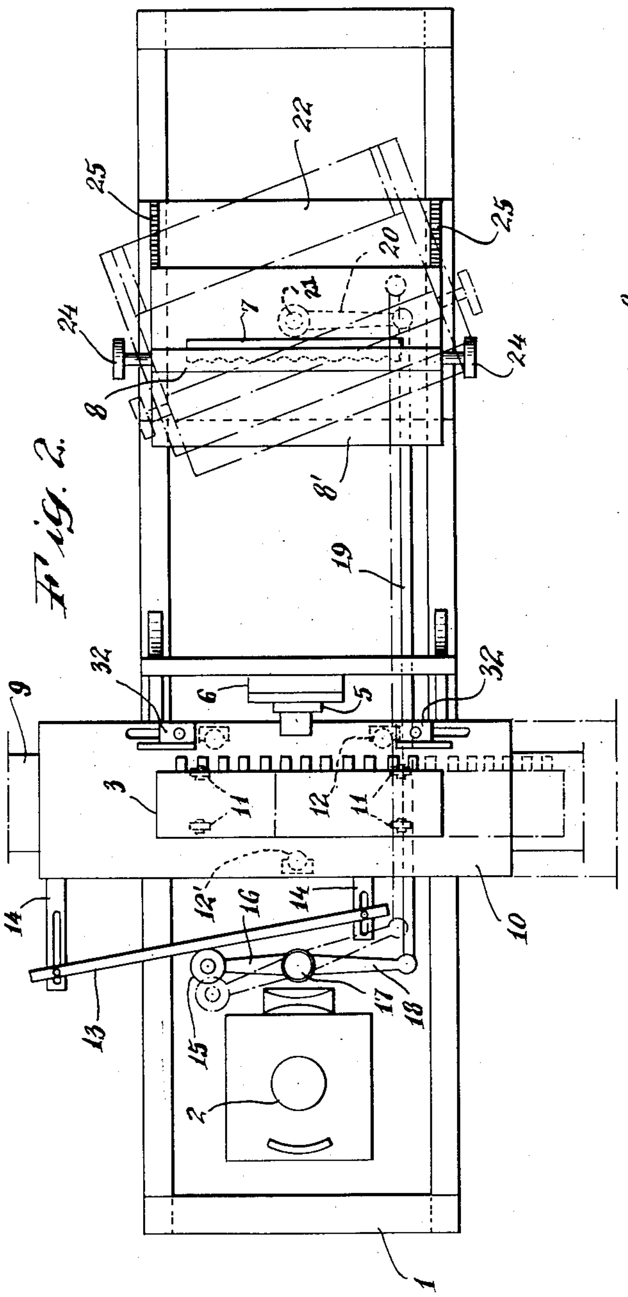

In my co-pending application, Ser. No. 625,385 filed Oct. 29, 1945 for "Peri-stereoscopic Apparatus, Utilisable for Reducing or Enlarging Positives, or for Taking Negatives," I described, in particular, a printer enabling peri-stereoscopic pictures to be obtained with a lined image preceded by a selectoscope or optical selector having goffered lenticular elements, starting from a negative formed by a series of distinct negative images each corresponding to a different angular aspect of the subject photographed.

Among the embodiments given by way of example in the said copending specification, Figure 9 thereof relates to a type of printer intended to be used when the views have been taken at a very great distance, or practically at infinity. In this case, the movement of the entire movable frame along an arc of a circle, which movement corresponds to concentric sighting on the subject photographed, is replaced by a rectilinear movement of translation at right angles to the optical axis of the printer. This constructional modification presents distinct advantages as far as construction is concerned, owing to the elimination of all machining of slopes or curved guiding surfaces of large radius, which are always delicate to execute in practice.

The present invention relates primarily to an embodiment of a printer of this latter type, operating according to the same principle, but presenting an improved material arrangement the advantages of which result, in particular, in a simpler construction and a steadier and more accurate operation, as well as in more extended possibilities of adjustment, which widens the field of application of the apparatus.

The invention also relates to means for obtaining a printer having a vertical optical axis, and furthermore presenting the same features as the printer described having a horizontal axis. It also relates to other improvements which will be mentioned hereinafter.

In the optical art a sliding movement is that which is imposed on an optical selector screen with line or lenticular elements or on a photosensitive surface associated with said selector screen, for the purpose of impressing successively new bands of photosensitive surface, by luminous rays which emanate from the photographic subject the aspect or appearance whereof evolves progressively while said movement of selection itself is progressively effected. All non-static relief photographic apparatus utilizes a selecting movement which can be either a movement of rotation of photosensitive-selector surface assembly around an axis parallel to the lines of the selector screen, or a sliding movement of the screen as against the photosensitive surface, transversely to the lines of the screen.

In accordance with the present invention, the relative movement to be obtained between the special photographic apparatus contemplated in our said specification in which the multiple negative to be printed is placed on the one hand, and the projection lantern and the plate-carrying frame on the other hand, is ensured not by a common displacement of the lantern and the frame, but by a transverse movement of the photographic apparatus alone. The major part of the printer can thus be made stationary, and the construction of the rolling carriage on which the photographic apparatus itself is placed presents no difficulty.

In my said prior specification, means have already been provided for shifting the plane of the proof with reference to the vertical pivot of the plate-carrying frame longitudinally in relation to the printer.

Experience has shown that it may be advantageous to make the said shifting greater than that provided originally, for which a simple sliding movement of the plate-carrying proof within the frame receiving it is insufficient. Therefore the present specification relates to constructional means rendering it possible to impart to the plate-carrying frame a comparatively long stroke with respect to its vertical pivotal axis, and to effect this in such a way that the displacement can be easily adjusted.

Finally, it has been found that in a "rectilinear" device of the type to which the present invention relates, the parallactic selection of the images, that is to say, that which is obtained by causing the angle at which the luminous rays meet the surface of the selectograph to vary, produced a certain distortion of the image projected. Consequently, for printers of the rectilinear type in question, it is advisable to use the known system of selection "by sliding," in which the selecting grating and the photo-sensitive surface execute a transverse relative movement in close contact with one another during the recording stroke of the apparatus or of the printer. Constant parallelism between the negative and the proof can thus be maintained, and the actual cause of the distortions considered is therefore eliminated.

Figure 1:
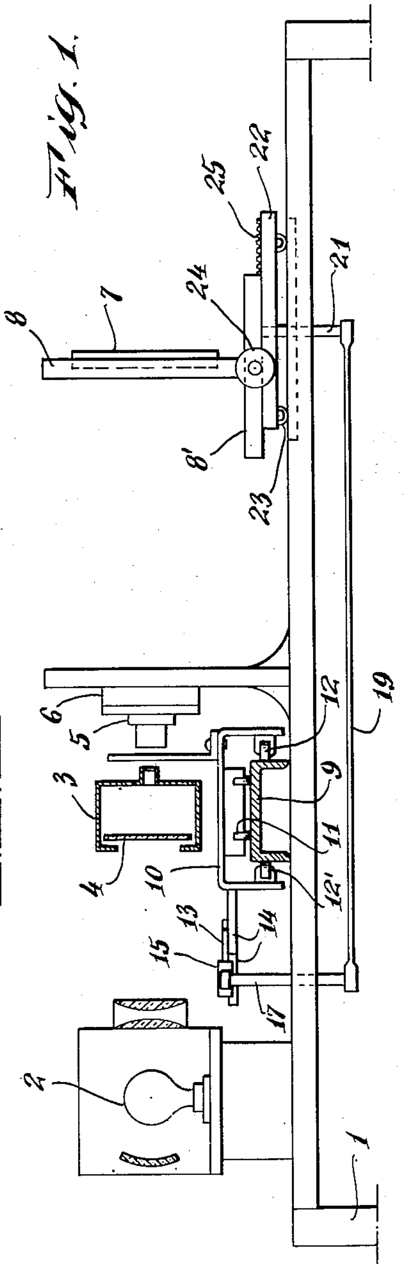
Figure 3:
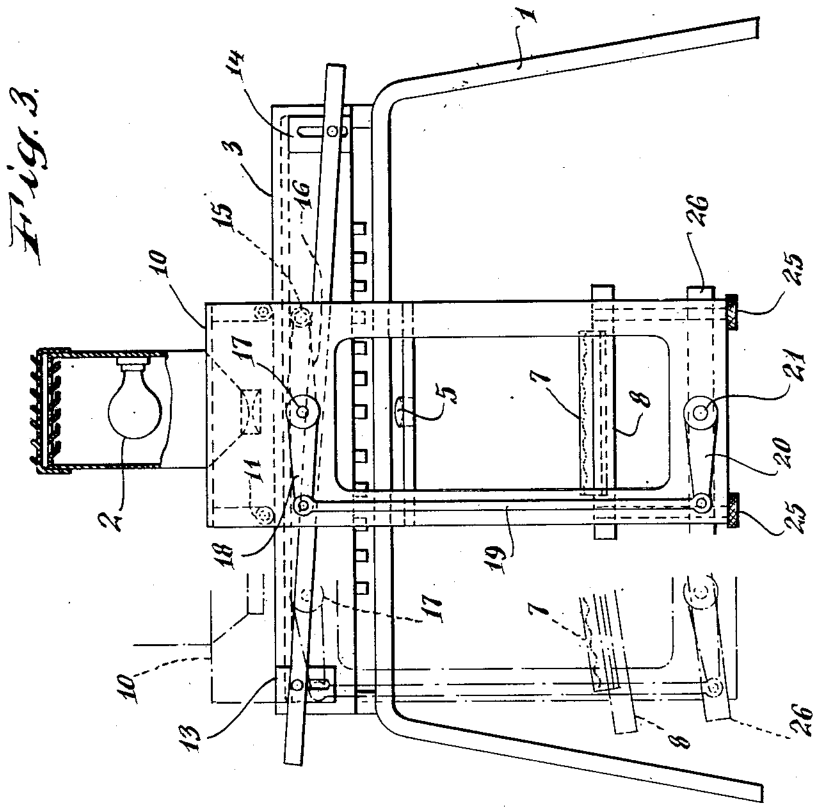
Figure 4:
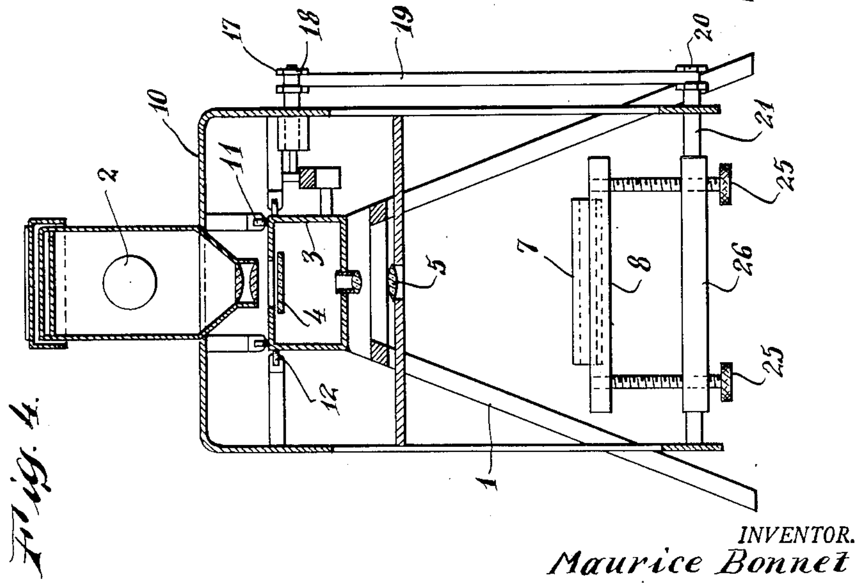
Figure 5:
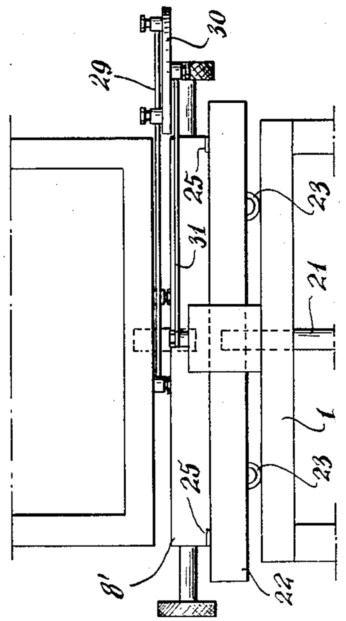
Figure 6:
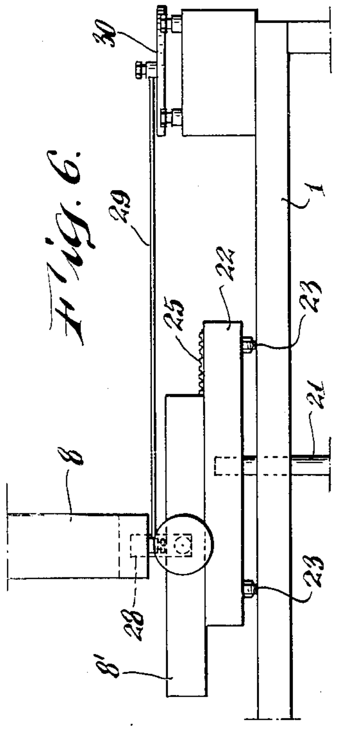
Figure 7:
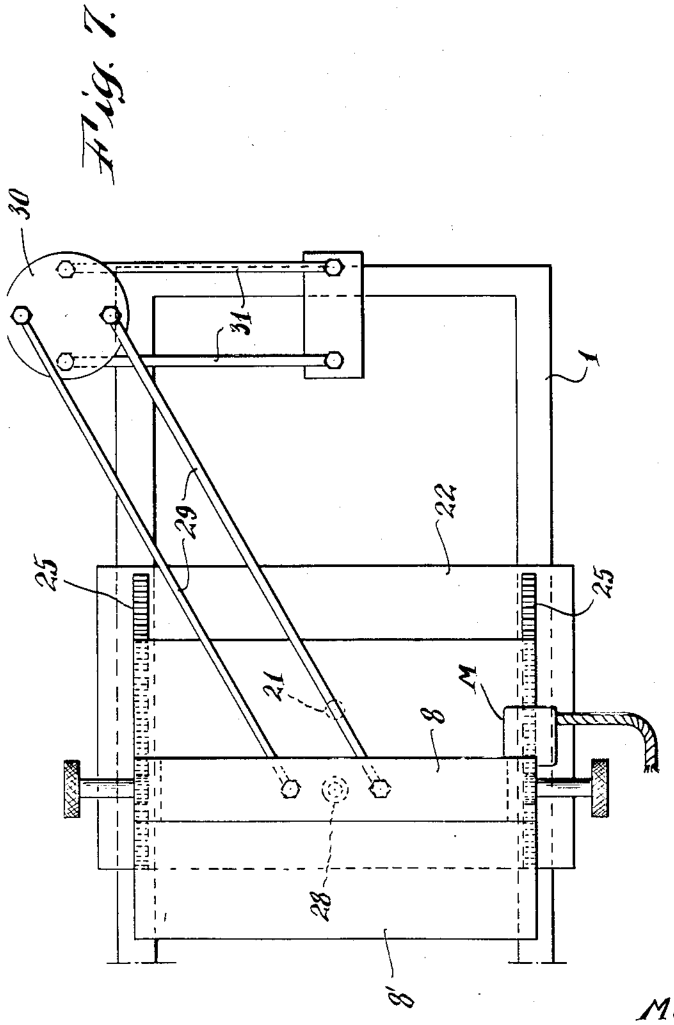

In the accompanying drawings Figs. 1 and 2 are respectively a side view and a plan view of a first embodiment of apparatus according to the invention based on parallactic selection. Figs. 3 and 4 are respectively an end view and a side view of a second embodiment of apparatus according to the invention and Figs. 5, 6 and 7 are respectively an end view, a side view similar to Fig. 1 and a plan view similar to Fig. 2 of a modification of part of the apparatus shown in Figs. 1 and 2, but based on sliding selection and drawn to a larger scale.

In these drawings, 1 denotes the main frame, 2 the projection lantern and 3 the camera or photographic apparatus having multiple lenses used for taking the negative and also serving for the projection of the latter. The negative, which has multiple horizontally juxtaposed images, is denoted by 4. 5 denotes the correcting lens mentioned in my said prior specification, this member being preferably secured in a fitting 6 provided with double de-centering means, allowing the adjustment and the placing in alignment of the said lens along the optical axis of the printer. It is preferable that this lens should be as near as possible to the lenses of the apparatus 3, so as to avoid any loss of field.

On the other hand, in order to reduce the effect of spherical aberration, to increase the sharpness of the proofs, the correcting lens 5 must be considerably shuttered down.

Finally, and in accordance with another feature of the invention, the lens 5 is preferably constituted by one of the two halves of a symmetrical doublet lens, the convex face of which is turned towards the photo-sensitive surface. This particular construction of the lens also contributes towards reducing the effects of spherical aberration and of field curvature.

A plate-holder 7 carrying the positive proof and the selectograph-carrier is placed in a plate-carrying frame 8. Preferably, intermediate means of any convenient type, not shown, are provided between the plate-holder 7 and the frame 8, in order to allow a certain de-centering of the plate-holder, and therefore a modification of the centering of the image projected.

In accordance with this embodiment of the invention and as above set forth, the lantern 2, as well as the correcting lens 5, remain stationary during the printing operation; it is the photographic apparatus 3 that moves transversely and at right angles to the optical axis, between the lantern and the lens 5.

For that purpose a rolling track, constituted in the example chosen by a U-shaped rail 9, is secured to the main frame 1. Over the rail 9 a carriage 10 moves, through the agency of rollers 11 and lateral guiding rollers 12. The rollers 12 are preferably three in number, the central roller 12′ being resiliently mounted, so as to take up any play, and to allow the carriage 10 to roll as accurately as possible over the rail 9. The resilient device for mounting the roller 12′, not shown in the drawing, may be constructed in various ways without widening the scope of the invention.

The movement of rotation which is to be imparted to the frame 8′ in synchronism with the transverse movement of apparatus 3 is brought about in this first embodiment, by the following mechanism, The carriage 10 carries a rectilinear rail 13, the obliquity of which relatively to the optical axis of the printer can be adjusted for instance by means of slideways 14. Against the rail 13 is resiliently pressed a roller 15, carried by a lever 16 rigid with a vertical pivot 17. The pivot 17 is suitably guided in the main frame 1. At its lower end it carries an arm 18, to the end of which is pivotally secured a rod 19. The other end of this rod is pivoted to an arm 20, which is of the same length as the arm 18, and is secured to a vertical pivot 21, also guided in the main frame 1. The elements 18, 19 and 20 constitute a parallel linkage system, through the medium of which the angular movement imparted to pivot 17 is transmitted to the pivot 21. The upper end of the latter carries a plate 22, which may be supported by rollers 23 rolling on a table of the main frame 1 to make the movement of rotation thereof around the pivot 21 easier. On the plate 22 the base 8′ of the plate-carrying frame 8 can be longitudinally displaced by means of operating knobs 24 controlling pinions which mesh with longitudinal racks 25 on the plate 22.

The operation of this device is as follows: The first image carried by the negative 4 is projected on to the positive photo-sensitive surface through the lens 5, the convergence of which is such that the said image is formed in the plane of the said surface. The photographic apparatus and its carriage are then located at one end of their transverse stroke, for instance in the position indicated in dot-and-dash lines in Figure 2. In this position the roller 15, urged back by the rail 13, occupies in its turn the position shown in dot-and-dash lines, so that the unit 22—28 occupies the oblique position illustrated.

During the displacement of the carriage 10 in the direction indicated by the arrow, the various images carried by the negative 4 are successively projected, and, by reason of the progressive modification of the inclination of the plate-carrying frame 8 produced by this displacement, the said images progressively impress the photo-sensitive surface in the form of image lines each corresponding to one of the lenses of the selectograph. Figure 2 shows in full lines the position occupied by the movable members when the apparatus 3 and the carriage 10 are at the middle of their stroke. The recording is finished when these members have reached their extreme position, symmetrical with reference to the starting position shown in dot-and-dash lines.

If the frame 8, by manipulation of the knobs 24, is bought into coincidence with the pivot 21, the image of objects located at infinity, which is formed in the plane of the pivot 21 (since the member 5 is so chosen as to cause the parallel rays issuing from the successive lenses to converge towards this point) will appear in the very plane of the photosensitive surface. Under such conditions the images of all objects located further to the front would all be formed in front of the plane of the photo-sensitive surface. Now, it may be advantageous in practice to distribute on either side of the plane of the sensitive surface the images of the various objects visible on the photograph. The displacement that may be imparted to the frame 8, relatively to plate 22 supporting it, allows of ensuring at will this distribution of the plane, as has moreover been disclosed in our said prior specification, but the present invention enables this to be done to a larger extent and with means that are easier to handle and more accurate than those provided in our said prior specification. Of course, focussing will be modified in consequence, by acting on the member 5, so that the sharp image is formed in the new plane occupied by the sensitive surface and not in the plane of the pivot.

The drawing shows a simplified embodiment, enabling the image to be printed in a single size. In order to obtain apparatus enabling photographs to be printed in different sizes, it is sufficient to render the rod 19 extensible, and to provide a movable mounting for the plate 22, and consequently for the pivot 21, along the main frame 1. To each size corresponds an optical member 5 of suitable characteristics, normally ensuring the formation of the image in the plane of the pivot 21. With a printer of this type, the additional focussing that has just been mentioned need not be effected in the event of a displacement of the planes; in fact, it is then sufficient to cause the plane of the sensitive surface to coincide with the plane wherein the rays converge, and to set back the pivot 21 by a corresponding amount. The result obtained remains the same.

Figures 3 and 4 show in front view and in cross section respectively a modification of a printer operating according to the same general principle as that illustrated in Figures 1 and 2, but having a vertical optical axis, this arrangement providing for the design of an apparatus of smaller over-all dimensions and of still further simplified construction.

A peculiarity of this modification consists in the fact that the rolling track intended for the movable unit is constituted by the photographic apparatus itself, which is therefore stationary, as in the embodiment described and illustrated in our aforementioned prior specification.

The same reference numbers have been adopted in Figures 3 and 4 to designate the members analogous to those of Figures 1 and 2.

The stationary part of this printer comprises the main frame 1, on which the photographic apparatus 3 with its multiple lenses rests directly, this apparatus being placed with the negative at its upper part. The body of the apparatus 3 is so devised as to form the rolling tracks intended for the bearing rollers 11 and the guiding rollers 12, which serve the same purpose as above.

The carriage 10 extends downwards on either side of the photographic apparatus, to form bars 27 supporting the horizontal spindle 21, round which can pivot the frame 8 receiving the plate-holder 7, containing the selectograph and the photosensitive surface.

In order to displace the frame along the optical axis of the printer with reference to the spindle 21, the latter acts on the frame through the medium of an armature 26, which is rotatable rigidly with the spindle 21, and to which the frame 8 is connected by means of adjusting screws 25, which serve the same purpose as the above-mentioned racks 25 of Figures 1 and 2. Of course, means may be provided without widening the scope of the invention, for simultaneously controlling these four screws, or they may be replaced by any other suitable device.

Here again the parallel linkage that controls the pivotal movement of the plate-carrying frame 8 is constituted by an arm 18 rigid with the spindle 17, together with the pivoted rod 19, and an arm 20 rigid with the spindle 21.

For the sake of clearness in the drawing, the arm 16 has been shown opposite the arm 20, with reference to the spindle 17. In fact, said arm 16 is keyed on the same side as the arm 18. Accordingly the rotational movement imparted to the frame 8 by the spindle 21, during the displacement of the carriage 27 is reversed as compared with that indicated in Figure 3.

The inclination of the optical rail 13 is adjustable through buttonholes 14 provided on the body of the apparatus 3. Against this rail there resiliently bears a roller 15, which rotates at the end of the control lever 16, also keyed to the spindle 17.

The operation of this second printer is identical with that of the first embodiment described herein. It may also be easily designed for printing proofs of different sizes, by rendering the bars 27 and the pivoted rod 19 extensible by means of any suitable device.

It is also possible, if considered preferable, to mount permanently on the main frame 1 stationary rolling tracks, upon which bear rollers 11 and 12. In this manner, the photographic apparatus 3 might be made lighter, and, if it is liable to receive shocks during service, on the outside for instance, the fixity of the images projected will not be affected by any deterioration that may occur in the rolling tracks it would otherwise carry.

It has been stated above that parallactic selection might be replaced by selection obtained through sliding in the printers according to the invention. Suitable mechanical devices, producing such relative sliding movement between the selecting grating and the photo-sensitive layer in synchronism with the general displacement of the apparatus, have already been proposed, and therefore need not be described in detail here. They can be adapted to the printer illustrated without any special difficulty. Such a device has been diagrammatically indicated at M in Figure 7; it is secured to the frame 8 and operatively connected to the selecting screen and positive carrier.

Figures 5, 6 and 7, which correspond to parts of the first embodiment given, show means for always maintaining the plate-carrying frame parallel to the negative, during the printing operation, when use is made of selection through sliding. It is to be understood that Figures 5 to 7 show only a part of the completed apparatus illustrating only those elements which differ in function from those shown in Figures 1 and 2 and bearing the same reference numerals. The apparatus of Figures 5 to 7 is completed by those of the elements of Figures 1 and 2 which are not shown in Figures 5 to 7.

In this modification the plate-carrying frame 8 is not firmly rigid with its base 8', as illustrated in Figure 1, but freely rotates on the latter, through the agency of a vertical spindle 28. At the lower part of the frame 8 are pivotally mounted two rods 29, the other ends of which are pivoted to a transmission disc 30, thus forming a first parallel linkage. This arrangement allows the frame 8 to freely pivot on its base 8', and the latter can move longitudinally on the racks 25 of the plate 22. Thus the frame 8 will remain parallel to itself and parallel to the negative when iti s moved towards or away from the member 5, this condition being indispensable for eliminating the distortions mentioned above. However, the pivotal movement of the plate 22 on the spindle 21, controlled by the transverse displacement of the apparatus 3, causes a relative movement of lateral translation of the frame 8 with reference to the optical axis passing through the optical member 5, when the spindle 28 of the said frame does not coincide with the pivot 21. This relative lateral translation of the frame 8 results in the creation of an additional effect of parallactic selection, which is added to the selection provided by sliding, and which must be taken into account. The two lateral screens 32 visible in Figures 1 and 2 serve this purpose. These screens are movable on the carriage 10, in the vicinity of the lenses, at each end of the row. Consequently the total angle of the beams of luminous rays that strike each of the lenses of the selectograph can be reduced to the necessary extent in order that the effect of the main selection obtained through sliding, to which is added that of the supplementary parallactic selection, may not exceed, altogether, the width of each lens of the selectograph.

Having now particularly described and ascertained the nature of my said invention and in what manner the same is to be performed, I declare that what I claim is:

1. A printing machine for peri-sterescopic pictures comprising a stationary printing lamp, a carrier for the positive emulsion and a selecting screen therefor, a shoe rigid with said carrier, a plate to which said shoe is slidingly and adjustably secured, and adapted to rotate round an axis lying substantially in the plane of the positive carrier, a multiple objective camera, the optical axis of which is perpendicular to said axis, inserted between the positive carrier and the lamp, means for inserting a multiple negative obtained through an identical camera in said multiple objective camera, means for imparting a rectilinear translation to the camera transversly with reference to the optical axis of the camera, and means whereby the translational progress of the camera produces an angular shifting of the rotary plate with reference to said optical axis.

2. A printing machine for peri-stereoscopic pictures comprising a stationary printing lamp, a carrier for the positive emulsion and a selecting screen therefor, a multiple objective camera inserted between the positive carrier and the lamp, means for inserting a multiple negative, obtained through an identical camera, in said multiple objective camera, a carriage for imparting a rectilinear horizontal translation to the camera transversely with reference to the optical axis of the camera, a linear guideway slantingly located with reference to the path of the camera and rigid with its carriage, a stationary pivot, a lever adapted to rock round same and to operatively engage, at one end thereof, said guideway, and means whereby said lever produces an angular shifting of the positive carrier with reference to the optical axis of the camera round a vertical axis.

3. A printing machine for peri-stereoscopic pictures, comprising a stationary printing lamp, a carrier for the positive emulsion and a selecting screen therefor, a shoe rigid with said carrier, a plate to which said shoe is slidingly and adjustably secured and adapted to rotate round an axis lying substantially in the plane of the positive carrier, a multiple objective camera, the optical axis of which is perpendicular to said axis, inserted between the positive carrier and the lamp, means for inserting a multiple negative, obtained through an identical camera, in said multiple objective camera, a carriage for imparting a rectilinear translation to the camera, transversely with reference to the optical axis of the camera, means for adjusting the longitudinal position of the rotary plate along the optical axis, a rectilinear guideway slantingly located with reference to the path of the camera and rigid with its carriage, a stationary pivot, a lever adapted to rock round said pivot, a roller at one end of the lever, operatively engaging said guideway, a rod of adjustable length pivotally secured at one end thereof to the other end of said lever and lying in substantial parallelism with the optical axis, and a further lever pivotally secured to the other end of said rod, rigid with the plate and the operative lever arm of which is substantially equal in length to that of the first lever.

4. A printing machine for peri-stereoscopic pictures comprising a stationary printing lamp, a carrier for the positive emulsion and a selecting screen therefor, a multiple objective camera inserted between the positive carrier and the lamp, means for inserting a multiple negative, obtained through an identical camera, in said multiple objective camera, means for imparting a rectilinear translation to the camera transversely with reference to the optical axis of the camera, means for shifting progressively the selecting screen with reference to the positive emulsion, and means whereby said rectilinear translation of the camera imparts said shifting to said screen.

5. A vertical printing machine for peri-stereoscopic pictures, comprising a printing lamp, a carrier for the positive emulsion and a selecting screen therefor, both lamp and carrier being mounted on a rolling frame, a stationary multiple objective camera, over which said frame is adapted to slide for operation, means for holding a multiple negative, obtained through an identical camera, in said multiple objective camera, the positive carrier being located beneath the lamp and negative holding means and being pivoted on the frame, a rectilinear guideway slantingly located with reference to the path of the frame and rigid with the camera, a pivot on the frame, a lever adapted to rock round said pivot, a roller at one end of the lever, operatively engaging said guideway, a rod pivotally secured to the lever and lying in substantial parallelism with the optical axis of the camera and a further lever, pivotally secured to the other end of said rod, rigid with the positive carrier, and the operative lever arm of which is substantially equal in length to that of the first lever.

6. A printing machine for peri-stereoscopic pictures comprising a printing lamp occupying a fixed position in the optical axis of the machine, a carrier for the positive emulsion and a selecting screen therefor, a multiple objective camera inserted between the positive carrier and the lamp, means for inserting in the camera a multiple negative obtained with an identical camera, means for imparting a rectilinear movement of translation to the camera transversely of the optical axis, and means including a parallel linkage system connected to the carrier and camera whereby the translational progress of the camera produces a selective movement of the selecting screen relative to the optical axis of the screen.

7. A machine as claimed in claim 6 comprising means supporting the positive carrier and adjustable to permit movement of the carrier along two mutually perpendicular directions of the plane thereof.

8. A machine as claimed in claim 6 further comprising a correcting lens located between the camera and the positive carrier, in close proximity to the camera lenses, and a diaphragm of small aperture cooperating with the correcting lens.

9. A machine as claimed in claim 6 further comprising a correcting lens constituted by one-half of a symmetrical object glass having a convex side facing the positive emulsion and located between the camera and the positive carrier, in close proximity to the camera lenses and a diaphragm of small aperture cooperating with the correcting lens.

MAURICE BONNET.

REFERENCES CITED

The following references are of record in the file of this patent:

UNITED STATES PATENTS

| Number | Name | Date |
|---|---|---|
| 1,883,290 | Ives | Oct. 18, 1932 |
| 1,942,638 | Draper | Jan. 9, 1934 |
| 2,080,604 | Draper | May 18, 1937 |
| 2,113,476 | Saint Genies | Apr. 5, 1938 |
| 2,131,693 | Smith | Sept. 27, 1938 |
| 2,135,396 | Saint Genies | Nov. 1, 1938 |
| 2,158,660 | Kanolt | May 16, 1939 |
| 2,175,114 | Friedmann et al. | Oct. 3, 1939 |
| 2,318,983 | Winnek | May 11, 1943 |